A. M. BULLARD & J. N. REYNOLDS.
M. R. BULLARD, ADMINISTRATRIX OF A. M. BULLARD, DEC'D.
CONTROLLING SYSTEM FOR AUTOMATIC SWITCHING APPARATUS.
APPLICATION FILED APR. 1, 1910.

1,020,185.

Patented Mar. 12, 1912.

Witnesses:
Morgan Washburn Jr.
Irving MacDonald Inventors:
Marion R. Bullard Administratrix
of the estate of Albert M. Bullard, deceased.
John N Reynolds.
by S. C. Hanner, Atty

UNITED STATES PATENT OFFICE.

ALBERT M. BULLARD, DECEASED, BY MARION R. BULLARD, ADMINISTRATRIX, OF WOODSTOCK, AND JOHN N. REYNOLDS, OF NEW YORK, N. Y., ASSIGNORS TO WESTERN ELECTRIC COMPANY, OF NEW YORK, N. Y., A CORPORATION OF ILLINOIS.

CONTROLLING SYSTEM FOR AUTOMATIC SWITCHING APPARATUS.

1,020,185.  Specification of Letters Patent.  Patented Mar. 12, 1912.

Application filed April 1, 1910. Serial No. 552,883.

*To all whom it may concern:*

Be it known that we, MARION R. BULLARD, administratrix, residing at Woodstock, in the county of Ulster and State of New York, and JOHN N. REYNOLDS, residing at New York, in the county of New York and State of New York, citizens of the United States, are in possession of an invention in a certain new and useful Improvement in Controlling Systems for Automatic Switching Apparatus, invented by ALBERT M. BULLARD, deceased, and the said JOHN N. REYNOLDS, of which the following is a full, clear, concise, and exact description.

This invention relates to telephone exchange systems of the automatic or semi-automatic type in which the selection of lines or trunks for the extension of telephone transmission circuits is accomplished by mechanical selector switches, the object being to provide an improved arrangement whereby the selective operation may be accurately and speedily accomplished.

One feature of the invention is concerned with the provision of simple, efficient and economical means for selecting a desired line, and for completing connections to such selected line, and comprises means whereby a plurality of selector switches may be driven from a common source of power, the application of power for driving any given switch being under the joint control of an electromagnetic mechanism individual to such selector, and an electro-magnetic mechanism common to a group of selectors, both of such mechanisms being controlled by a sender device over a trunk or connecting circuit to which such switch is connected.

In large automatic or semi-automatic systems designed to accommodate many lines the number of selecting switches necessary to accomplish selection rapidly increases as the number of lines increases, as may be readily understood, and it is, therefore, one of the features of this invention to reduce the amount of necessary apparatus by providing a system involving controlling devices and a selecting or switching apparatus composed of a common or master driving mechanism with which is associated a plurality of individual selector switches, any one of which may in turn be operated by the driving mechanism. In a system of this kind it is necessary to provide means for rapidly and accurately associating the master driving mechanism with any one of the associated individual selector switches during the operation of setting up a connection.

More specifically this invention comprises as its main feature an automatic selector apparatus embracing a plurality of individual selector switches and a master power mechanism designed to drive said individual selector switches one at a time without making the entire group busy. This is accomplished by means of a finder mechanism which successively picks up the individual selector switches and associates them one at a time with the master mechanism. While there is nothing to prevent the seizure of a trunk line leading to an individual selector mechanism, if at the time of this seizure some other connection is utilizing the master mechanism, the association of the selector mechanism, with which is associated the trunk line last seized, with the master mechanism will be delayed until the cycle of operations of the master mechanism in connection with the selection in the first selector mechanism is completed. This cycle of operations is exceedingly brief in point of time and the call, even though delayed, will be retarded but little.

This invention also involves certain details of construction and organization of the circuits and apparatus by which all of the operations incidental to the proper establishment of connections may be accomplished.

For the purpose of clearly setting forth the invention, it is described and shown in connection with mechanical selector switches operating in connection with what is known as the panel type of multiple and in connection with other specific mechanisms and arrangements of circuits, but it must be understood that this invention is not limited to such switches, mechanisms or circuits further than is specifically indicated in the claims appended hereto.

Figure 1:
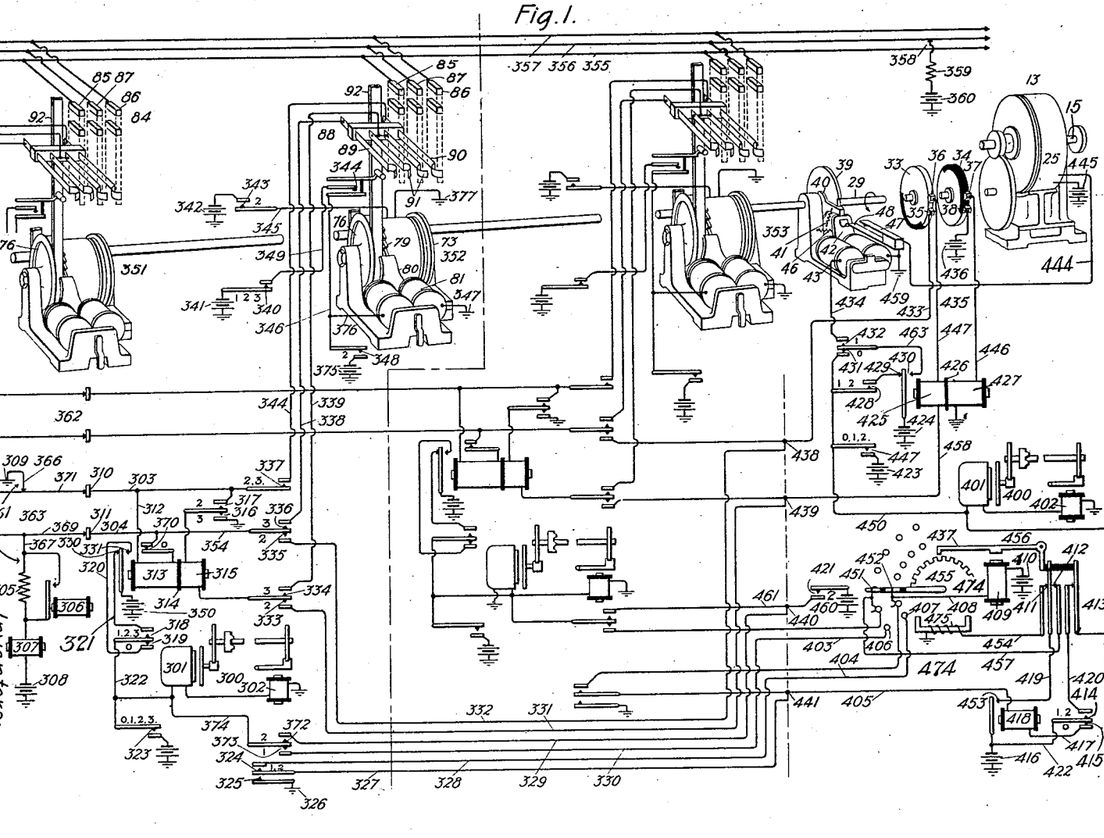
Figure 1 illustrates partly diagrammatically and partly in perspective the invention in connection with a master driving mechanism, three individual selectors, a finder system and a controlling or sending device.

*The selector.*—The selecting mechanism in connection with which this invention is illustrated is shown partly diagrammatically and partly in perspective in Fig. 1. It is of the master and individual type of mechanism arranged to be operated on what is known as the panel form of selector multiple. This multiple consists preferably of strips of metal having contact points spaced at regular intervals along their entire length. These strips are placed one upon another with strips of insulating material between, in such manner as to form vertical banks of contacts over which the selector contact brushes can be moved in a vertical direction, each vertical bank of contacts forming the coöperating terminals of a separate selector. The banks may comprise any desired number of sets of contacts and the selector multiple may comprise as many multiple banks as may be conveniently used. As herein described, each bank is considered as accommodating contacts forming the transmission and test terminals of 100 lines, but it should be understood that this invention is not limited to such construction.

In Fig. 1 a part of a bank of contacts as referred to above is indicated generally at 84. The set of contacts 85, 86 and 87 form, respectively, the transmission and test terminals of the line 355, 357 and 356 to a further selector. The brush carrier 88 carries the brushes 89 and 90 arranged to contact respectively with the terminals 85 and 86, and the brushes 91 arranged to contact with the test terminal 87. This brush carrier, which is shown in detail in Figs. 8, 9, 10 and 11, and will be hereinafter more specifically described, is carried by a metallic tape 92, passing around the sheave 76 of the driving mechanism individual to the selector and an idle pulley (not shown) at the top of the bank of terminals. This tape when moved by the rotation of the sheave 76 carries the brushes into position to make contact with the terminals 85, 86 and 87 of the desired line, the selection being determined by the extent of the movement of the tape, the control of which will be hereinafter fully set forth.

Briefly considered, selection is accomplished by causing the brush carrier, which normally stands at the bottom of the first set of contact terminals to be moved over each set of contact terminals until the desired set has been reached where the brushes are brought to rest.

As shown in Figs. 8 to 11 the brushes 89, 90 and 91 are supported on a carriage 88 slidably mounted upon a rod 94 which extends the entire height of the selector. This carriage 88 is securely attached to the metallic tape 92 by the screws 95, but is insulated therefrom by the insulating bushings 96. The carriage itself is composed of two body portions 97 and 98 in order to render possible the accurate adjustment of the brushes with relation to the terminals and to the tape 92. This construction is shown clearly in Fig. 11, wherein the tape 92 is shown attached to the part 98 and the brushes are carried by the part 97, the two parts being securely fastened together by means of the bolt 99 while the coöperating serrations 100 upon the parts 97 and 98 serve to prevent their disadjustment after they have been once secured.

Figures 8, 9, 10, 11:
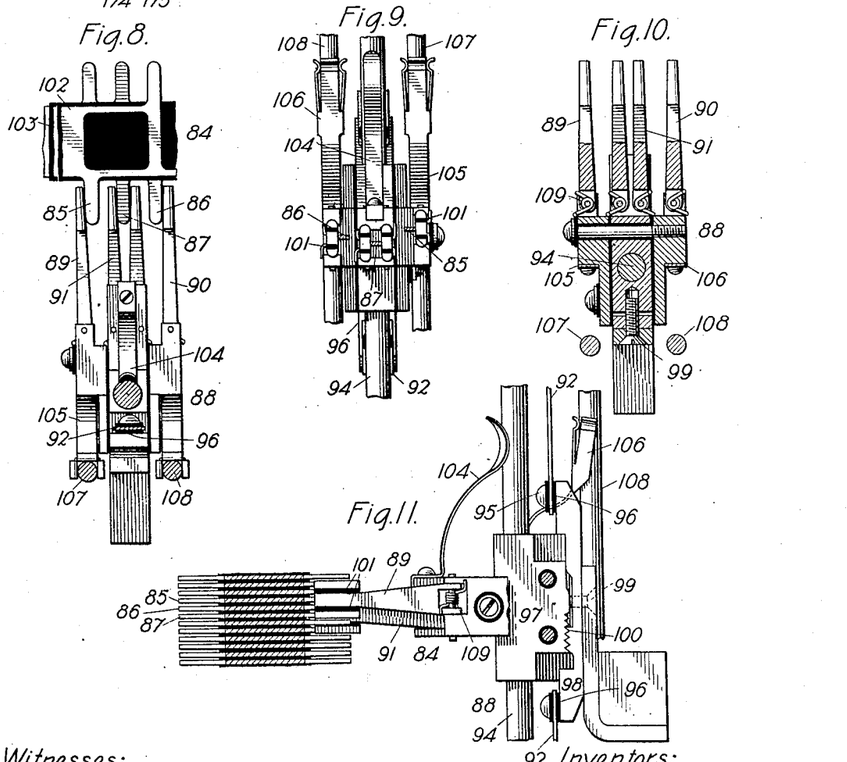
Figs. 8, 9, 10 and 11 are detailed views of the brush carrier used in the selector shown in Fig. 1.

The brushes 89, 90 and 91 are so arranged, as will appear from Fig. 11, that they make mechanical contact with one terminal before leaving the preceding one, but owing to the inserts of insulation 101 upon their contact faces, do not make electrical contact with more than one terminal at a time. These brushes moreover are arranged out of alinement with each other in order to bring them into proper relation with the set of terminals 85, 86, 87 which are arranged as will be seen from Figs. 8 and 11 in staggered relation, the lowermost being terminal 87 and the uppermost being terminal 85. This relation of the terminals is necessary owing to the construction indicated in Fig. 8, where it may be seen that such terminals are formed by projections upon the conducting pieces 102 laid between sheets of insulation 103 as is usual in the construction of selectors of what is known as the panel type. The brushes 89, 90 and 91 are pivotally mounted upon the carriage 88 as will be readily seen and are pressed into contact with the terminals 85, 86 and 87 by the springs 109. The brushes 91 are in electrical connection through their mounting with the contact spring 104, which spring makes contact at all times with the rod 94 upon which the carriage moves, and thereby places the brushes 91 in constant electrical contact with this rod to which the selector test lead is electrically connected. The brushes 89 and 90 are each mounted upon a portion of the carriage insulated from each other and from the portion on which the brushes 91 are mounted and each in turn is electrically connected by means of the contact springs 105 and 106 with the auxiliary rods 107 and 108 which also extend the full height of the selector and serve to connect the transmission circuit to the brushes 89 and 90.

Figure 2:
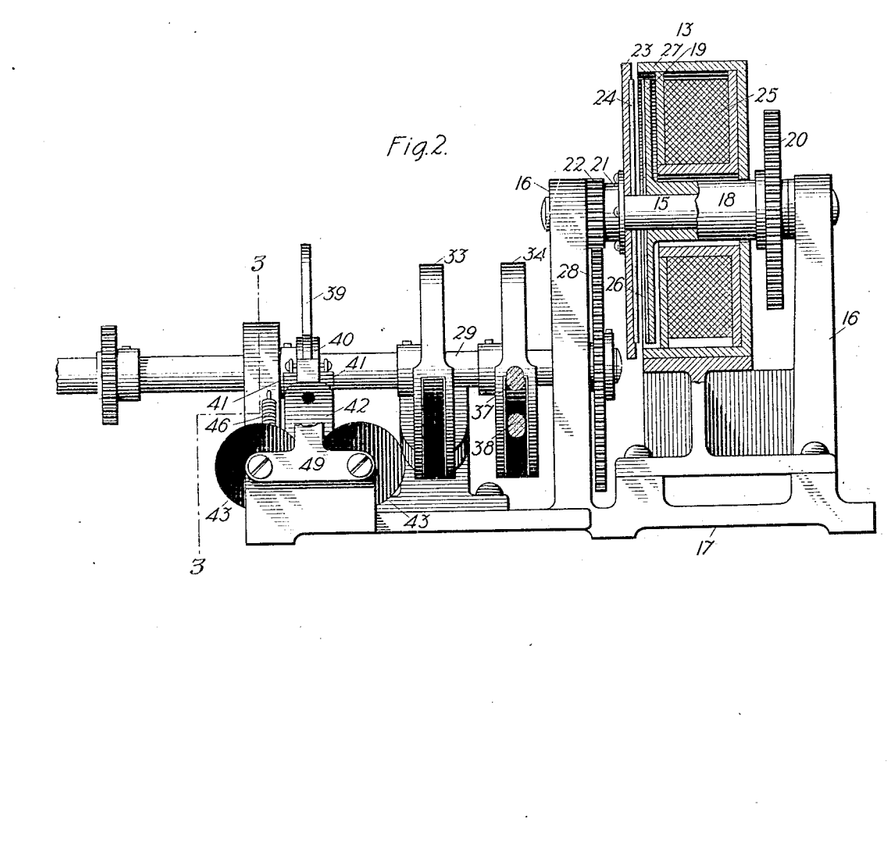
Fig. 2 is a side elevation partly in sections of the master driving mechanism, the two commutators and the stop magnet.
Figure 3:
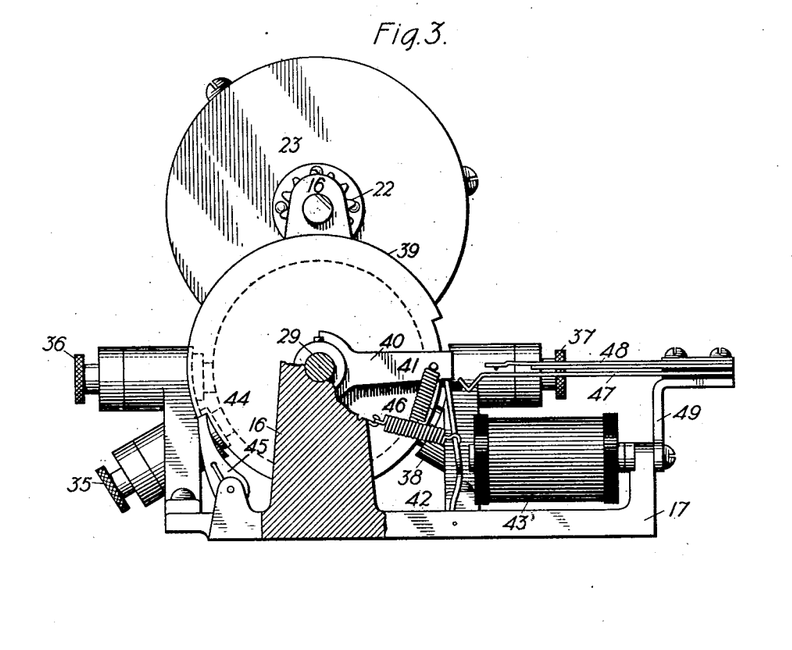
Fig. 3 is a transverse vertical section of the master driving mechanism taken on the line 3—3 of Fig. 2.
Figure 4:
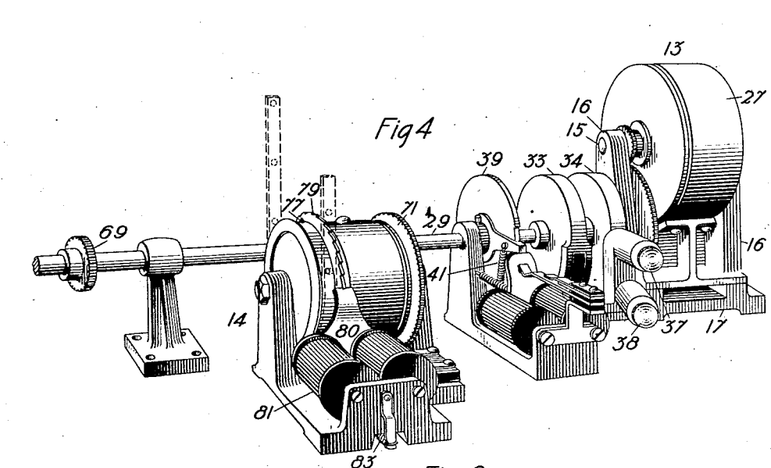
Fig. 4 is a perspective view of the selector apparatus including the master driving mechanism, two commutators and the stop magnet, which are common to a plurality of individual selectors. There is also shown in this figure one of the individual mechanisms of this group of selectors. All of this apparatus is shown diagrammatically in Fig. 1.

*Master driving mechanism.*—The driving mechanism by which power is supplied for moving the brushes 89, 90 and 91 on the brush carrier 88 into contactual relation with the terminals 85, 86 and 87 is shown in Fig. 4 by the master clutch mechanism 13, common to a plurality of selectors, and the mechanism 14 individual to a single selector switching apparatus. The master clutch 13, a side elevation of which, partly in section, is shown in Fig. 2, comprises a shaft 15 mounted upon the uprights 16, extending from the base 17, and has in turn rotatably mounted thereon a sleeve 18, to one end of which is attached the disk 19 and to the other end of which is attached the gearwheel 20. This gearwheel 20 is in permanent mesh with another gearwheel (not shown) upon a constantly rotating shaft, which may be, and is preferably, that which supplies power to the various apparatus of the exchange. Upon the shaft 15 is also mounted the sleeve 21 to one end of which is attached the gearwheel 22 and to the other end of which is attached the disk 23. The disk 23, of soft iron or other magnetic material, forms the armature of the electromagnet 25 mounted upon the base 17 and surrounding the shaft 15 and the sleeve 18. The disk 19, formed of brass or other non-magnetic material, is provided with a friction surface 26 arranged to oppose and coöperate with the friction surface 24 upon the central portion of the disk or armature 23. The circular pole piece 27 surrounds the disk 19 and when the electromagnet 25 is energized it attracts the disk 23 which moves freely upon the shaft 15, and brings the disks 19 and 23 into intimate frictional contact, causing the rotation of the disk 23. The arrangement of the disks 19 and 23 with respect to the pole piece 27 is such that when the disk 23 is attracted, its periphery will be closely adjacent to the pole piece 27, in order that it may be firmly held in contact with the disk 19, but will not be in actual contact with the pole piece itself. The gearwheel 22 meshes with the gearwheel 28 fixed upon the shaft 29, also mounted upon the uprights 16. Upon the shaft 29 are also mounted the commutators 33 and 34. The commutator 33 coöperates with the contacts 35, 36 and serves to make and break the circuit between these contacts once for every revolution of the shaft 29. The commutator 34 similarly coöperates with the contacts 37, 38 to make and break the circuit between these contacts at each revolution of the shaft 29. The relation of the make and break of the circuits between contacts 35 and 36, 37 and 38, respectively, will be hereinafter referred to, and set forth in the description of the operation of the system.

The disk 39 which is also mounted on the shaft 29 has coöperating therewith the arm 40 mounted upon the shaft 29 and held in particular relation to the disk 39 by the springs 41, which are fastened at their respective ends to the disk and the arm. This arm 40 coöperates with the armature 42 of the stop magnet 43 to stop the rotation of the disk 39 when the magnet 43 has been deenergized, but to permit a slight over-run by the disk 39 due to the extension of the springs 41, which overrun will, however, be corrected and the disk 39 brought back into proper position by the contraction of the springs 41.

Coöperating with a notch 44 upon the disk 39 is a pawl 45 mounted upon the base 17 and so arranged that upon the reverse movement of the disk 39, due to the contraction of the springs 41, the disk 39 may not by any mischance move too far in the reverse direction. By means of the arm 40 and the pawl 45 the disk 39 when stopped by the armature 43 will always come to rest in precisely the same position. The armature 42, which is normally in a retracted position, due to the tension of the retracting spring 46, operates when attracted for purposes hereinafter set forth to close the contacts 47 and 48, which are mounted upon an extension 49 from the base 17, insulated from each other and from the extension 49.

Upon the shaft 29 are fixed at proper intervals as shown in Figs. 1, 2 and 4 the gearwheels 69 which transmit power to the individual driving mechanisms 14.

Figure 5:
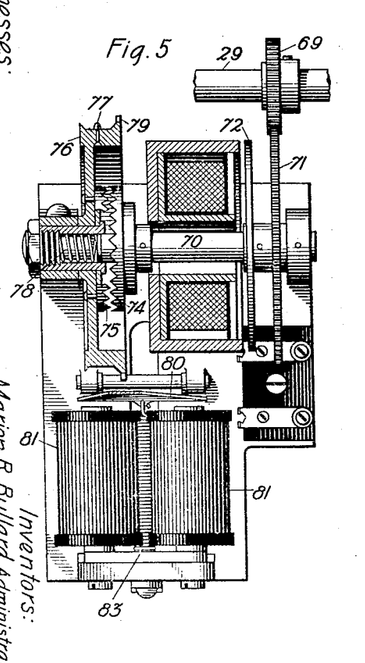
Fig. 5 is a horizontal section of the driving, holding and release mechanism individual to each selector switch.
Figure 6:
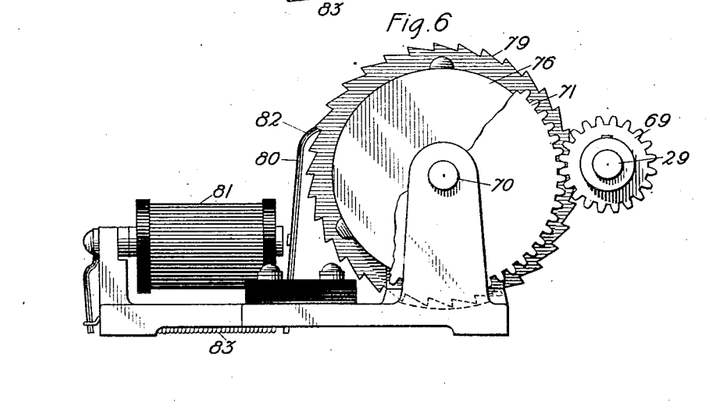
Fig. 6 is a side view of such individual driving, holding and release mechanism.

*Individual driving mechanism.*—The individual driving mechanism shown in Figs. 5 and 6 comprises the shaft 70 to one end of which is affixed the gearwheel 71 which meshes with the gearwheel 69, above referred to, upon the main driving shaft 29. Adjacent to the gearwheel 71, and also affixed to the shaft 70 is the disk 72 of soft iron, or other magnetic material, which forms the armature of the electromagnet 73, which when energized attracts the disk 72 to move the shaft 70 so that the clutch member 74 fixed on the other end of the shaft is moved into coöperative relation with the clutch member 75, fastened to the sheave 76 around which the metallic tape 92 is adapted to pass. This sheave 76 has set in the periphery thereof projecting pins 77 which coöperate with the holes in the metallic tape 92 to prevent the tape slipping upon the sheave. The shaft 70 is normally held in a position in which the clutch member 74 is out of coöperative relation with the clutch member 75 by means of the spring 78, as is plainly shown on Fig. 5. The inner rim of the sheave 76 is made to form a ratchet by having cut therein the teeth 79. Coöperating with these teeth 79 is the armature 80 of the electromagnet 81 by the energization of which the armature is adapted to be attracted out of coöperative relation with the teeth 79. The armature 80 is normally held retracted in engagement with the teeth 79 by the spring 83. The movement of the sheave 76, therefore, depends upon the energization of the clutch magnet 73 and the rotation of the shaft 29. The shaft 29, however, having moved the sheave and tape into any given position, they may be prevented from returning by the armature 80 under the control of the release magnet 81.

Figure 7:
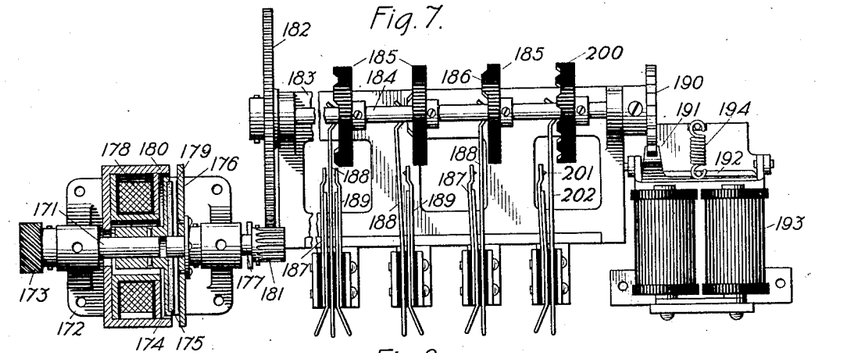
Fig. 7 is a plan view of a sequence switch as used in connection with the master and individual mechanisms shown in Fig. 1.

*Sequence switch.*—To control the local circuits at the various parts of the system, which local circuits must be established in definite order at successive stages of the operation, to bring into service different devices or parts as desired, there are used automatic switching appliances which are termed "sequence switches." There is, for example, a sequence switch associated with the master driving mechanism and a sequence switch associated with each individual driving mechanism as is indicated upon Fig. 1 of the drawings. These sequence switches each consist of a movable switch operating member, a number of circuit-changes being made in sequence as said member is moved from one position to another; an electromagnet and a constantly rotating source of power, the connection of which with the movable member is controlled by said magnet for advancing said movable member. In each position to which the movable member of the sequence switch is advanced a set of circuits is established by which a given operation of the device under control is made possible and at the same time another circuit is prepared for energizing the controlling magnet of the sequence switch. This new energizing circuit for the controlling magnet will be closed at the proper time to advance the sequence switch to the next position in which it will establish a new set of circuits and bring about a new operation or electrical condition of the device or devices under its control and so on. One form of sequence switch mechanism is shown in Fig. 7 and is also diagrammatically shown in connection with the various portions of the apparatus in Fig. 1 as for instance the individual sequence switch 300 and the master sequence switch 400. In this form of sequence switch (Fig. 7) 173 is a gear wheel driven by a constantly rotating shaft, not shown. This gearwheel 173 is fixed upon a shaft 171 mounted upon a base 172 and having at the end opposite the gearwheel 173, a disk 174 of brass or other non-magnetic material. Adjacent to the disk 174 is a disk 176 fixed on the shaft 177 and forming the armature of the clutch magnet 178. This disk 176 is formed of soft iron or other magnetic material and has on the face thereof adjacent to the disk 174 a friction surface of suitable material 179 coöperating with a similar friction surface 175 upon the disk 174. Upon the energization of the electromagnet 178 the disk 176 will be drawn adjacent to the circular pole piece 180 of the electromagnet, and will be brought into intimate frictional contact with the disk 174 which is constantly rotating and the two disks will, therefore, rotate together. Upon the shaft 177 is also fixed a gearwheel 18 which meshes with the gearwheel 182 fixed on a shaft 184 which is mounted on a base 183. On this shaft 184 are fixed the cam wheels 185 made of insulation, upon th outer rim of which are formed the cam sur faces 186 which coöperate with the con tact springs 188 to force such springs int and out of contactual relation with the v: rious contact springs 187 and 189 as the ca wheels 185 revolve, the movement of tl springs 188 depending upon the formatic and position of the cam surfaces 186 upc the cam wheels.

A special switch is preferably provided control a local circuit through the electr magnet 178, whereby when the initial ene gizing circuit is broken by one of t switches the motor magnet may still be e cited by current in the local circuit until t next intended stopping place of the rota element is fully reached. As shown in F 7 a cam 200 for operating a local cont: 201 is adapted to be engaged by a spri 202, said cam being provided on its mar; with a plurality of teeth and said spri 202 being provided on its free end with offset portion. When the offset portion gages a high part of the cam 200 the spr 202 closes a local contact 201 which cont: the local circuit for the motor magnet. teeth of the cam 200 have inclined edge: that the offset portion of the spring 202 a: riding over the point of the tooth is fo: down the opposite slope by the spring p sure and thus tends to push against the to continue the rotation thereof until offset portion reaches the bottom of the lowing notch and the contact 201 is c pletely opened. The rotary element is brought to rest accurately in each of the sitions in which it is intended to stop. the operation of the device each circuit first be closed for the clutch magnet thr one of the springs 188 and one or the of the contact springs 187 or 189. Then as the motor magnet is excited and the shaft of the sequence switch begins to rotate the contact through which the clutch magnet was initially excited may be broken, but the local circuit will be maintained for the motor magnet through the contact 201 and the rotary element will thus continue to advance until the contact 201 is opened. As these special contacts are closed only while the rotary element of the sequence switch is in transit from one position to the next, the numbers are placed on the side of the switch lever opposite from the contact and indicate positions in which said contact is open.

Fastened upon one end of the shaft 184 is a stopwheel 190 formed with notches upon its periphery in which the projection 191 upon the armature 192 of the electromagnet 193 is adapted to rest when said armature is retracted to stop the rotation of the shaft promptly and accurately when the position desired has been reached and the electromagnet 193 has been deënergized. The spring 194 serves to retract the armature 192 upon the deënergization of the electromagnet 193.

*Finder mechanism.*—The finder mechanism by means of which the individual selectors are picked up one by one and associated with the master mechanism is shown diagrammatically in Fig. 1 and comprises generally a clutch magnet adapted to engage a rotatable magnetic disk carrying an arm upon which are mounted two electrically separated brushes adapted to engage contact members arranged in rows concentric to said rotatable disk. The said disk is provided on its margin with teeth or notches adapted to be engaged by the free end of a swinging lever which lever is adapted to be drawn into engagement with the teeth on the disk by the action of a holding magnet located between the ends of said lever. There are the same number of teeth or notches in the margin of the magnetic disk as there are pairs of brush contacts and the operation of the holding or locking magnet serves to bring the disk to rest with the brushes thereon resting upon a pair of contacts. The pivotal end of the swinging lever is adapted to control local contact springs for opening and closing circuits through various parts of the apparatus.

*Operation.*—In Fig. 1 there is shown diagrammatically an embodiment of the invention including three individual selectors 351, 352 and 353, a master driving mechanism 13 and a finder mechanism 474. The selectors in the system shown are controlled by means of sending mechanism operating upon what is known as revertive impulse control. Briefly stated this control is according to the following plan: When connection is made with the selector a controling or stepping circuit is established, including a line relay or magnet at the master driving mechanism and a ralay or magnet at the sender adapted to operate a step by step mechanism. The line relay at the master driving mechanism closes a local circuit through a clutch magnet which starts the master driving mechanism in rotation; in such rotation an interrupter is operated by the master driving mechanism to intermittently short circuit the line, causing pulsations in the controlling circuit in unison with the advance of the selector, which pulsations cause the stepping relay or magnet at the sender to operate the step by step mechanism thereof and measure off at the sender the extent of movement of the selector. When the sender apparatus reaches a predetermined point which the operator has selected it completes a circuit for a "stop relay" which renders inoperative the line relay at the master driving mechanism thus bringing that particular selecting operation to an end. So much of the sender apparatus 361 is also shown, as is necessary for a complete understanding of the invention, but since the sender does not form a part of this invention, it is only partially and diagrammatically shown. Contacts 438, 439, 440 and 443 indicate common connecting points between the circuits of the several individual selectors and the master. The trunk conductors 303, 304, which may form a part of the telephone transmission circuit lead to a selecting mechanism 352 by which such telephone transmission circuit may be extended to the conductors 357, 355 or other similar conductors. A similar trunk circuit leading to the selecting mechanism 353 is indicated at 362. The selector associated with the conductors 303, 304, is one in which it is desired to select a certain line of a group of lines. It should be understood, however, that the invention is not limited to selectors of this character but may be used with equal advantage in connection with selectors in which connection is to be made with an idle trunk line of a group, any one of which will equally well serve the purpose of the connection. Associated with the circuit 303, 304, by any suitable means are the leads 369 and 371 of the sender apparatus. The connection of these sender leads to the circuit 303, 304 may be either permanent or temporary, as may be preferred, but since this connection forms no part of this invention it is only diagrammatically indicated as at 310 and 311.

The operation of the various parts of the system through which the connection of a desired line with the selector 352 is accomplished is as follows: The sender apparatus is first operated to energize a stop relay 306 to place a shunt around the high resistance 305. Prior to the energization of the stop relay 306 a circuit existed from the battery 308, stepping relay 307, high resistance 305, conductor 367, conductor 369, contact terminal 311, conductor 304, individual sequence switch contact 370, winding 313 of line relay 314, conductor 312, conductor 303, contact terminal 310, conductor 371, conductor 366 to ground 309. The current in this circuit, however, due to the inclusion of the high resistance 305 and the fact that winding 313 of line relay 314 is also of high resistance, is insufficient to energize either the stepping relay 307 or the line relay 314. However, upon the pulling up of the armature of stop relay 306, the shunt is closed around the high resistance 305 and sufficient current thereupon passes through the circuit traced to energize the line relay 314, although not sufficient to energize the stepping relay 307 because the high resistance winding 313 of line relay 314 is still included in the circuit. The completion of this circuit causes the line relay 314 to operate, however, and by means of its front contact to drive the individual sequence switch 300 from its rest or zero position to position 1 by means of the following circuit: battery 350, the armature and front contact 331 of the relay 314, conductor 320, sequence switch contact 319, conductor 322, clutch magnet 301, and stop magnet 302 of the individual sequence switch 300 and ground back to battery.

The special individual sequence switch contact 323 serves to insure the movement fully into its first position, being closed at all times except when the sequence switch is in the positions noted adjacent this contact. At position 1 sequence switch contacts 319 and 370 are opened and contacts 318, 324, 325 and 373 are closed. The closure of sequence switch contact 318 makes provision for the restoration of the individual sequence switch at any time by the release of the line relay 314. The individual selector mechanism is now in readiness to be picked up by the finder, and the closure of sequence switch contact 325, provided the master mechanism is at rest, allows current to flow from battery 416, conductor 422, master sequence switch contact 415, conductor 417, finder relay 418, conductor 405, conductor 327, sequence switch contact 325 to ground 326 and back to battery. This causes the operation of finder relay 418, which by its armature and front contact causes the energization of the finder clutch 475 by means of the following circuit: battery 416, armature and front contact 453 of relay 418, conductor 419, finder contact 411, conductor 454, clutch 475 to ground and back to battery. At position 1 individual sequence switch contact 324 has closed to ground a point on the finder multiple which corresponds to this particular individual selector mechanism 352. The energization of clutch 475 causes the finder to revolve in its hunt for the terminals of the individual selector 352, with which the sender mechanism is associated over the trunk leads 303, 304. When this point has been reached current flows from battery 410 through the finder stop magnet 409, conductor 408, contact brush 452, contact terminal 407, conductor 404, conductor 328, sequence switch contact 324 to ground 326 and back to battery. This causes the operation of the finder stop magnet 409 bringing the detent 437 into engagement with the corresponding tooth on the ratchet wheel 455, thus causing the finder to come to rest with the brushes 451 and 452 making contact with the terminals 406 and 407. At the same time the operation of the armature 456 opens the contacts 411 to remove the power from the driving clutch 475. The operation of the armature 456 at the same time closes the contacts 412 to cause the individual sequence switch to move into the second or selecting position by means of the following circuit: battery 416, armature and front contact 453 of relay 418, conductor 419, contacts 412, conductor 457, contact brush 451, contact terminal 406, conductor 403, conductor 330, sequence switch contact 373, conductor 374, clutch magnet 301, and stop magnet 302 of the individual sequence switch 300 to ground and back to battery.

It will be noted that as soon as the individual sequence switch has been moved from its zero or normal position into any of its succeeding positions the circuit from the battery 416 through the finder relay 418 is opened and remains open until the operation of the particular selector with which this individual sequence switch is associated is completed and that sequence switch has been returned to its normal or zero position. This arrangement makes it impossible to operate the finder through the operation of a succeeding selector until the one which has last become associated with the master driving mechanism has completed its operation and the individual sequence switch associated with that selector has returned to its zero or normal position. Thus since there is but one individual selector per pair of contacts on the finder there can be only one of such selectors associated with the master driving mechanism at one time.

In position 2 of the individual sequence switch the sequence switch contact 348 closes to operate the release magnet 81 from battery 375, sequence switch contact 348, conductor 376, release magnet 81 to ground 34 and back to battery, and the sequence switch contact 343 closes to operate the individual clutch 73 from battery 342, sequence switch contact 343, conductor 345, clutch magnet 73 to ground 377 and back to battery. As long, therefore, as sequence switch contact 348 and 343 remain closed the sheave 76 the individual driving mechanism will be coupled through the individual clutch to the master driving shaft 29 and the release magnet will remain operated holding the pawl 80 out of engagement with the teeth 79 on the sheave 76. Also while the individual sequence switch is in position 2 the master driving mechanism is in readiness for operation with the individual selector under control of the sending mechanism 361, sequence switch contacts 317, 333 and 335 closing to complete the selecting circuit by connecting the selecting relay 426 in a shunt around the high resistance winding 313 of the line relay 314: conductor 354, sequence switch contact 335, conductor 332, conductor 433, brushes 35 and 36 on commutator 33, conductor 447, winding 425 of relay 426, conductor 458, conductor 331, sequence switch contact 333, winding 315 of line relay 314, sequence switch contact 317 to conductor 371. The winding 425 of selecting relay 426 and the winding 315 of the line relay 314 both being of low resistance this circuit just traced acts as a sufficient shunt around the high resistance winding 313 of relay 314 to cause the operation of the stepping relay 307.

When the selecting relay is energized it serves, by means of its front contact, to advance the master sequence switch 400 from its zero or resting position to position 1 for selection. This circuit may be traced from battery 424, armature and front contact 430 of relay 426, conductor 463, sequence switch contact 431, conductor 450, clutch magnet 401, and stop magnet 402 of master sequence switch 400 to ground and back to battery. At position 1 of the master sequence switch the sequence switch contact 431' opens to stop the movement of the switch, and contact 432 closes to cause the operation of the master mechanism through the following circuit: battery 424, armature and front contact 430 of selecting relay 426, sequence switch contact 43  conductor 434, stop magnet 43 to ground 459 and back to battery. This energizes the stop magnet 43 withdrawing the armature 42 from engagement with the arm 40 on the stop wheel 39. The attraction of the armature 42 also closes the contact springs 47 and 48 and completes a circuit which may be traced from battery 445, main driving clutch magnet 25, conductor 444; contacts 47 and 48 to ground 459 and back to battery. The closure of this circuit through the master clutch magnet 25 couples the shaft 29 through the gearing shown, to the constantly rotating shaft 15. The shaft 29 and the sheave 76 of the individual selector will now move together owing to the energization of the individual clutch magnet 73. This will cause the metallic tape 92 to move and the brush carrier 88 will be elevated the distance between any two adjacent sets of terminals during one rotation of the shaft 29. The rotation of the shaft 29 will now move the disk 33 so that the shunt circuit around the high resistance winding 313 of the line relay 314 is opened by the contacts 35 and 36 resting upon the insulated portion of the commutator 33. The rotation of the commutator 34, also attached to shaft 29 has, however, closed a circuit to maintain the selecting relay 426 energized while the above shunt circuit is open, by the closure of the circuit from the battery 436, contacts 37 and 38, and the metallic portion of the commutator 34, conductor 446, winding 427 of selecting relay 426 to ground and back to battery.

The opening of the shunt circuit around the high resistance winding 313 of line relay 314 at the contacts 35 and 36 has so reduced the current in the circuit as to cause the deënergization of the stepping relay 307. As the shaft 29 continues to rotate, however, circuit is again made through the metallic portion of the commutator 33 to close the shunt circuit around the high resistance 313 of line relay 314, and upon a slightly further rotation of the shaft 29 the local energizing circuit of the selecting relay 426 through the winding 427 thereof is opened by the contacts 37 and 38 coming upon the insulated portion of the commutator 34. If at this stage of the operation the high resistance 305 in the sender remains shunted by the armature of the cutoff relay 306, the rotation of the shaft 29 and the consequent elevation of the brush carrier will be continued until the brushes have passed over another set of terminals. These operations will be repeated and the contact brushes caused to move upward over the sets of contact terminals until the energization and deënergization of the stepping magnet 307 has stepped the sender device to normal, at which time the stop relay will become deënergized and open the shunt around the high resistance 305. When now the rotation of the shaft 29 has caused the opening of the local energizing circuit through the winding 427 of the selecting relay 426 and has again closed the shunt circuit around the high resistance winding 313 of line relay 314, insufficient current will pass through the winding 425 of the selecting relay 426, due to the presence in the circuit of the high resistance 305, to maintain said selecting relay 426 energized and its armature will be retracted opening the circuit through the step magnet 43 and closing a circuit from battery 424, armature and back contact 429 of the selecting relay 426, sequence switch contact 428, conductor 450, clutch magnet 401 and stop magnet 402 of the master sequence switch 400 to ground and back to battery. This will cause the master sequence switch 400 to move from its first to its second position, at which point the sequence switch contact 421 will be momentarily closed to drive the individual sequence switch from its second or selecting position to its third or talking position over a circuit which may be traced from battery 460, sequence switch contact 421, conductor 461, conductor 329, sequence switch contact 372, conductor 374, clutch magnet 301 and stop magnet 302 of the individual sequence switch 300 to ground and back to battery. Upon leaving position 2 contact 348 is opened to deënergize the release magnet 81 to permit its spring to retract its armature into engagement with the corresponding tooth 79 on the sheave 76 to maintain the brushes elevated. In moving into this new position the individual sequence switch releases the individual selector from connection with the master mechanism and its associated aparatus by opening sequence switch contacts 317, 324, 325, 333, 335, 343, 348 and 372. At the same time the master sequence switch 400 continues on from its second position to its normal or zero position where it is stopped by the opening of sequence switch contact 428. This leaves the master mechanism in position to be picked up by any other of the associated individual selectors on which a call may appear, as sequence switch contact 415 is again closed allowing finder relay 418 to be energized by ground from any individual sequence switch.

At position 3 of the individual sequence switch the following contacts are closed to hold the connection and complete the talking circuit: 316, 334, 336 and 337. Assuming now that the brush carrier has been brought to rest with the contact brushes 89, 90 and 91 resting upon the contact terminals 85, 86 and 87, of the desired line, it will be seen that a circuit is completed from the battery 360 located at the distant end of the selected line through the resistance 359, contact 358, conductor 356, contact terminal 87, brushes 91, conductor 339, sequence switch contact 334, winding 315 of line relay 314, sequence switch contact 316 to ground. The closure of this circuit serves to maintain the line relay 314 in its operated position, and also acts as a shunt on the battery 360 and the resistance 359 to maintain the selected line in the busy condition.

When it is desired to restore the individual selector to its normal position the contact 358 at the distant selector is opened by any suitable means, causing the deënergization of the line relay 314, which in turn drives the individual sequence switch to its normal position through a circuit which may be traced from battery 350, contact 330 of line relay 314, conductor 321, sequence switch contact 318, conductor 322, clutch 301 and stop magnet 302 of the individual sequence switch 300. This causes the movement of the individual sequence switch from its third to zero or normal position. At this position sequence switch contact 340 is closed completing a circuit from battery 341, conductor 349, off normal contact 344, conductor 346, holding magnet 81 of the individual selector to ground 347. This energizes the latter and causes the holding pawl 80 to be withdrawn from engagement with ratchet teeth 79 on the sheave 76. This allows the brush carrier 88 to be returned by gravity to its normal position at the bottom of the bank of terminals, where the off normal contact 344 is opened allowing the holding magnet 81 to be released.

We claim—

1. In a telephone exchange system, the combination with a plurality of individual selectors, of a master driving mechanism for said selectors with which only one of said selectors can be associated at a time, and means operating to associate said selectors severally with said master mechanism.

2. In a telephone exchange system, the combination with a plurality of individual selectors, of a master mechanism adapted to drive said selectors and means operating to associate said individual selectors severally with said master mechanism and to prevent the simultaneous associating of a plurality of said selectors therewith.

3. In a telephone exchange system, the combination with a plurality of individual selectors, of a master mechanism adapted to drive said selectors, a finder device arranged to associate said master mechanism with any one of said selectors, and switching apparatus associated with each of said selectors to control said finder device.

4. In a telephone exchange system, the combination with a plurality of individual selectors, of a master mechanism adapted to drive said selectors, a sequence switch associated with each of said selectors, and finder device arranged to associate said master mechanism with any one of said selectors through contacts of its associated sequence switch.

5. In a telephone exchange system, the combination with a plurality of individual selectors, of a master mechanism adapted drive said selectors, a sequence switch individual to each of said selectors, and a finder device arranged to associate said master mechanism with any one of said selectors, said finder device being initially controlled by one of said sequence switches and thereafter controlling said sequence switch.

6. In a telephone exchange system, the combination with a plurality of individual selectors, of a master mechanism adapted to drive said selectors, a finder device arranged to associate said master mechanism with any one of said selectors, and me controlled by said finder device to cause the operation of said master mechanism.

7. In a telephone exchange system, the combination with a plurality of individual selectors, of a master mechanism adapted to drive said selectors, a sequence switch individual to each of said selectors, a finder device arranged to associate said master mechanism with any one of said selectors, said finder being initially controlled by one of said sequence switches and thereafter controlling said sequence switch, and a master sequence switch under the joint control of said finder and one of said sequence switches arranged to control said master mechanism.

8. In a telephone exchange system, the combination with a plurality of individual selectors and individual sequence switches therefor, of a master mechanism adapted to drive said individual selectors, a finder arranged to associate said selectors severally with said master mechanism, said finder embracing movable brushes and a plurality of terminals connected with the several selectors, means controlled by the operation of said sequence switches to cause the movement of said finder brushes and means for bringing said finder brushes to rest upon the contact of a selector the associated sequence switch of which has been operated.

9. In a telephone exchange system, the combination with a plurality of individual selectors and individual sequence switches therefor, of a master mechanism adapted to drive said individual selectors, a finder device arranged to associate said selectors severally with said master mechanism, said finder device embracing movable brushes and a plurality of terminals connected with the several selectors, a clutch magnet controlled by the operation of one of said sequence switches to cause the movement of said brushes, said sequence switch in its operation also grounding a contact on the finder terminal corresponding with the selector with which that sequence switch is associated, and a holding magnet for said brushes operated when the coöperating brush engages said grounded contact.

10. In a telephone exchange system, the combination with connecting circuits and a plurality of individual selectors adapted to extend said connecting circuits, of a master mechanism adapted to drive said selectors, a finder device arranged to associate said selectors severally with said master mechanism and means operating upon the completion of selection to free the operated selector from said master driving mechanism and render said master mechanism and finder free to become associated with the selector through which the succeeding connection is to be extended.

11. In a telephone exchange system, the combination with connecting circuits and individual selectors adapted to extend said circuits, of a master mechanism adapted to drive said selectors, a finder device arranged to associate said selectors severally with said master mechanism and switching apparatus controlled by said finder device to operate said mechanism and upon the completion of selection to disengage said master mechanism and finder from the operated selector and render them free to be associated with the selector over which the succeeding connection is to be extended.

In witness whereof, we hereunto subscribe our names this 30th day of March, A. D., 1910, and 31st day of March, A. D., 1910, respectively.

MARION R. BULLARD,
*Administratrix of the estate of Albert M. Bullard, deceased.*

JOHN N. REYNOLDS.

Witnesses as to signature of Marion R. Bullard:
R. M. ROOTY,
HARRY T. CRISP.

Witnesses as to signature of John N. Reynolds:
MORGAN WASHBURN, Jr.,
IRVING MACDONALD.

---

Copies of this patent may be obtained for five cents each, by addressing the "Commissioner of Patents, Washington, D. C."